Feb. 14, 1956 K. F. NOTHDURFT 2,734,545
DOUBLE ACTING SPRING LOCK WASHER
Filed May 9, 1955
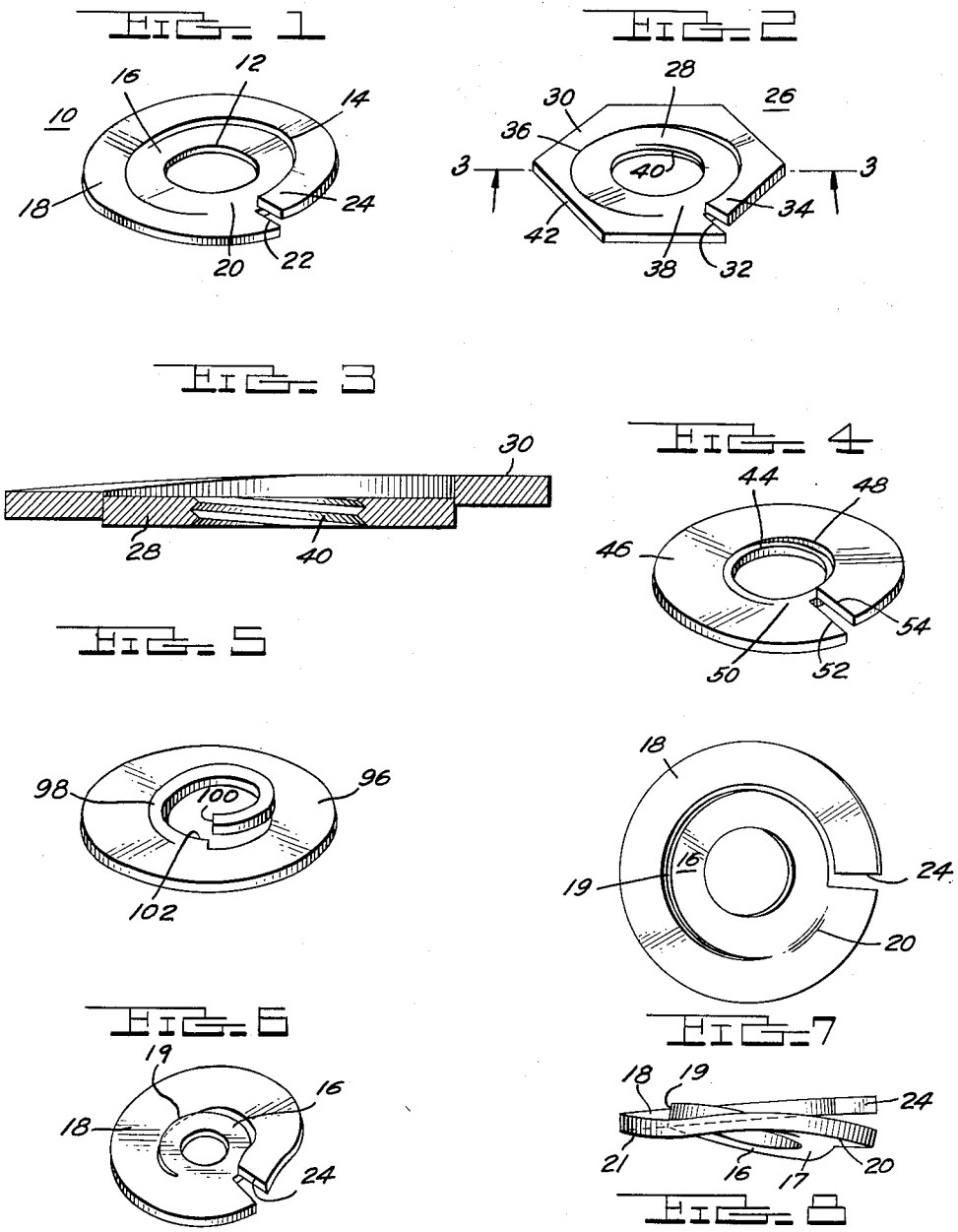
INVENTOR
KARL F. NOTHDURFT
BY Burton & Parker
ATTORNEY

2,734,545

DOUBLE ACTING SPRING LOCK WASHER

Karl F. Nothdurft, Detroit, Mich.

Application May 9, 1955, Serial No. 507,019

3 Claims. (Cl. 151—38)

This invention relates to washers and particularly to an improved combination washer constructed for use as a lock or spring washer.

An important object of this invention is to provide an improved form of washer which is so constructed that it may be used as a plain or lock washer depending upon the circumstances of its employment and which may be threaded similar to a nut upon a fixed member such as a bolt. Another important object of the invention is to provide a novel combination washer comprising concentric parts which are separated from one another for the major portion of their respective lengths but are integrally connected together into a unit which enables the washer to be conveniently used either as a plain or lock washer depending upon the circumstances of its use. A further important object of the invention is to provide a combination washer of this character which is thoroughly effective in any employment in which washers are used yet is inexpensive to manufacture and can be installed quickly and conveniently applied with a minimum amount of labor.

In carrying out the invention, a ring-shaped member of flat resilient material is so formed that one annular body portion thereof is completely integral throughout its circular extent to serve as a plain washer as well as to enable the member to be conveniently and quickly installed, and that another annular body portion is shaped to provide a novel locking prong or tongue. An important feature of the invention is the fact that the annular portions are formed out of the same blank and are integrally connected together into a unit in concentric juxtaposed relationship to one another.

Another important feature of the invention is the manner in which the annular body portions are partially cut off or divided from one another such that the body portion forming the locking prong has a circular extent of substantially 360°. In any form of washer design illustrated herein, the washer member is capable of being manufactured quickly and cheaply and shaped with the circular locking prong during the process of forming a blank into the washer.

The two concentric annular sections comprise an inner annular section and an outer annular section. These two annular sections are formed of the same sheet of metal. One section is a continuous ring section and forms a plain washer; the other section is a split ring and forms a lock washer. The lock washer section exhibits a free end at the split. The split ring section may be either the inner annular section or the outer annular section. Such split ring section is attached to the continuous ring section from a bridging portion which bridging portion is immediately adjacent to the split.

The split ring section has a length of approximately 360° from its bridging point to its free end. It is bent out of the plane of the continuous ring and is disposed in a helical plane extending from its bridge connection with the continuous annular section to its free end. In order to minimize the danger of the washers becoming entangled when they are stored en masse, the free end of the split annular ring section may be slightly inclined from its helical plane toward the plane of the other continuous annular ring section.

In a further development of the invention, a feature of the invention is the provision of novel means for threading the washer member upon an externally threaded element such as a bolt and the like and the further provision of novel means for facilitating the turning of the washer as it is threadedly advanced. For this purpose, the inner or central portion of the washer is provided with internal threads and the outer portion is provided with flat sides imparting a polygonal exterior shape to the washer.

Another object of the invention is the provision of a washer having inner and outer substantially concentric annuli connected together by a bridging portion, and which annuli are twisted relative to each other out of the nominal plane of the washer, whereby each annulus forms a resilient compression-resisting element of the washer.

This application is a continuation-in-part of my application Serial No. 406,700 filed January 28, 1954, now abandoned.

Various other objects, advantages and meritorious features of the invention will become more fully apparent from the following specification, appended claims, and accompanying drawings, wherein:

Fig. 1 is a perspective view illustrating a preferred form of the invention;

Fig. 2 is a perspective view similar to Fig. 1 but illustrating a modified form of washer of polygonal shape having internal threads;

Fig. 3 is an enlarged cross-sectional view of the washer of Fig. 2 taken along line 3—3 thereof;

Fig. 4 is a perspective view of a modified form of washer generally similar to that of Fig. 1;

Fig. 5 is a perspective of a washer similar to the view shown in Fig. 1 but being a modification wherein the inner annular ring is split rather than the outer as shown in Fig. 1;

Fig. 6 is a perspective of the washer shown in Fig. 1 slightly modified thereover;

Fig. 7 is a top view of a washer similar to the washer shown in Fig. 6; and

Fig. 8 is a side view of the washer shown in Fig. 7 and similar to the washer shown in Fig. 6.

In general, the invention comprehends a washer combining both plain and locking features enabling it to be used either as a plain washer on wooden or the like elements or as a locking washer on metal elements. The combination washer of this invention is formed from a flat blank and so shaped with cuts or slits in the member that it is divided into two or more annular body portions arranged in concentric radially offset juxtaposed relation to one another and integrally connected to one another to form a unitary assembly. One annular body portion is completely integral throughout its circular extent and in this shape may serve as a plain washer. The annular body portion is separated from the plain body portion by a narrow slit, preferably extending substantially concentric with the axis of the washer and is further shaped so that the body portion extends at an inclination to the first body portion to form a helical locking prong having a circular dimension of slightly less than 360°. The second annular body is provided with a free end which is offset to the plane of the completely integral body portion and which is disposed immediately adjacent to the connection between the two annular portions.

The material out of which the washer members of this invention is formed may be of metal, fiber or other material suitable for the purpose. When constructed of metal, the washer members may be formed from sheets of spring steel stamped or punched in presses or it may be die-cast into the desired formation. An alternative process of manufacture would be to form the annular sections of the washers separately and integrally join the sections together by welding or the like.

Referring particularly to the drawings, the washer member illustrated in Fig. 1 is generally indicated by the reference numeral 10. It comprises a ring-shaped member having a central aperture 12 for the reception of a bolt or the like. Appoximately midway between the inner and outer margins of the member a narrow arcuate opening or slit 14 is provided which extends completely through the thickness of the member and divides the member into an inner annular body portion 16 and an outer annular body portion 18. The arcuate slit 14 is substantially concentric to the axis of the member and extends as shown in Fig. 1 a little short of 360° of a circle. The balance of this circle is left uncut thereby forming an integral bridging connection 20 between the inner and outer annular portions. It is to be noted that the annular portions 16 and 18 are offset radially from one another but are disposed in concentric juxtaposed relationship to one another, the inner margin of the outer body portion being close to the outer margin of the inner body portion.

An important feature of the invention is the shaping of one of the annular body portions, such as the outer portion 18 of Fig. 1, so that it forms a locking prong. This is accomplished by radially dividing the outer body portion at a point immediately adjacent to the integral connection 20 between the two body portions. As shown in Fig. 1, a radial slit 22 is formed in the outer body portion which extends transversely thereacross from the inner margin to the outer margin thereof. The slit 22 extends from one end of the arcuate slit 14 substantially radially of the washer member to the outer margin of the annular portion 18 thereby completely covering the outer portion at a point immediately adjacent to the connection 20 joining the two portions of the washer member together. It is to be noted, as illustrated in Fig. 1, that the outer annular portion 18 is inclined to the inner annular portion so as to dispose the free end 24 of the outer annular portion offset to the plane of the inner annular portion. The outer annular portion may be inclined to the position shown at the time the blank is formed into a washer member 10, or in a subsequent operation. The inclination of the outer portion commences at the connection 20 and extends preferably at the same angle completely around the axis of the washer to the free end 24 thereof. As a result, the outer annularly shaped prong 18 exhibits a helical formation which disposes its free end 24 in a plane offset to the original plane of the washer. As is customary in locking washers in general, the outer annular portion 18 and its free end 24 are deformed under pressure by the engagement of nut or like element therewith and will act to lock the nut firmly in its final threaded position.

Figs. 2 and 3 illustrate a further development of the locking washer member of Fig. 1 and particularly the provision of means for threading the washer member upon an externally threaded object such as a bolt and of further means for facilitating the rotation of the member thereon. Referring particularly to Fig. 2, the washer member is generally referred to by reference numeral 26 and similar to Fig. 1 comprises an inner annular body portion 28, which is completely integral throughout its circular extent, and an outer annular body portion 30. The latter is similar to the outer portion 18 of Fig. 1 and is radially cut as at 32 to form a free end 34 and has imparted an inclination thereto throughout its arcuate extent such that the free end is offset axially to the plane of the central portion 28. The two annular portions of the washer member of Fig. 2 are separated from one another by a cut or slit 36 which has a circular dimension slightly less than the complete circle so as to leave a narrow connecting portion 38 between the two annular portions which serves to join the two into a unitary assembly.

An important feature of the modification of Figs. 2 and 3 is the provision of internal threads 40 on the inner annular portion 28 to enable the washer member to be threaded upon a bolt or other externally threaded element upon which the member may be secured. A further important feature of this modification is the external shape of the washer member such that it may be rotated by a tool. This is accomplished by making the external edge of the outer portion 30 non-circular in formation, as shown, and particularly in a polygonal shape so that it is provided with a plurality of flat sides 42 circularly spaced therearound. Thus constructed, the washer member of Figs. 2 and 3 may be threaded upon a bolt by means of a wrench or other tool so that the washer member is held on the bolt against axial movement thereon except by rotating the washer member.

Fig. 4 illustrates a modification of the invention wherein the respective radial dimensions of the two annular body portions are of distinctly different size. As shown in Fig. 4, the inner annular portion 44 has a very narrow radial dimension approximating that of its thickness so that it forms a narrow band or ring of metal. As in the previously described embodiment of the invention, the inner portion 44 is completely integral throughout its circular extent and, so shaped, the inner portion 44 is capable of slidably fitting a fixed element such as a bolt. The outer annular portion 46 of the modification illustrated in Fig. 4 has a radial dimension many times that of the inner portion 44.

The outer portion 46 of the embodiment of the invention illustrated in Fig. 4 is separated from the inner portion by an almost completely circular slit 48, the ends of which terminate short of one another to provide a narrow bridging connection 50 between the two body portions. Likewise, as in the previously described embodiment of the invention, the outer annular portion is divided by a substantially radially extending slit 52 which extends from one end of the circular slit 48 to the outer margin of the washer member. The outer body portion 46 is helically inclined throughout its circular extent with respect to the inner portion 44 so that the free end 54 is disposed in a plane offset to the plane of the inner ring section 44. Thus constructed, the washer member of Fig. 4 has a locking prong of considerable radial dimension which prong is integrally joined to a narrow ring section 44 for fitting upon a fixed element. In this construction of Fig. 4 the narrow width of the inner section insures a nut even of small diameter overlapping the outer section so as to be locked thereby.

Fig. 5 indicates a washer which differs from that of Fig. 1 in that the outer annular portion 96 is integral and continuous and the inner annular portion 98 is split and exhibits a free end as at 100. In Fig. 1 it is the outer annular portion which is split. The split inner annular portion is inclined helically from the bridging portion 102 to its free end 100. It is inclined out of the plane of the outer annular portion. The inner annular portion is relatively narrow in width. A nut even of small diameter would normally extend across the inner annular portion so as to engage the outer annular portion. Because this particular washer has the inner annular portion split instead of the outer, there is less likelihood of entangling a mass of washers in a storage bin or carton. Because it is the inner annular portion which is the lock washer part and because such portion is relatively narrow it will be found that a nut even of small diameter will be urged by this helical portion into locking engagement. A small diameter nut might be only slightly engaged if it were the outer portion that was split as shown in Fig. 1.

Fig. 6 illustrates a washer of the general type shown in Fig. 1, except that in these two figures the outer annular portion which is indicated at 18 has its free end 24 bent slightly out of its helical plane and toward the plane of the inner annular portion 16. This slight bending of the free end toward the general plane of the washer serves the purpose of minimizing any tendency of washers to become entangled. The entangling of lock washer prongs results in considerable loss of time on the part of the workmen during use of the washers because of the necessity of disentangling the washers. In this modification shown in Fig. 6 the inner annular portion 16 which is continuous and integral has a part 19 which is generally diametrically opposite to the free end 24 of the outer annular portion bent slightly out of the general plane of the washer and in the direction of the helical inclination of the outer annular portion as it extends away from the bridging portion to its free end.

The outer annulus of the washers shown in Figs. 6–8 is generally helically shaped and spirals upwardly from the bridging portion 20 around to its free end 24. The inner annulus is bent out of the nominal plane of the washer, and in such respect differs from the washers shown in Figs. 1–4. This bending may be such that a portion of the inner annulus, as at 19, lies above the outer annulus. Another portion 17 of the inner annulus lies below the plane of the outer annulus. This bending of the inner annulus may be at any number of different points around the annular extent of the inner annulus, but in the drawing it is shown as being bent at or through the bridging portion 20 connecting the two annuli together.

As shown particularly in Fig. 8, the entire inner annulus is bent at the bridging portion out of the nominal plane of the washer such that the plane of the inner annulus lies in angular relation to both the nominal plane of the washer and to the outer annulus and the bridging portion 20. The bridging portion 20 serves somewhat as a resilient hinge connection between the inner and outer annuli in the construction shown in Figs. 6–8, in that when a nut or bolt head is tightened down upon the washer and compresses the washer against a plane surface, both the inner and the outer annuli resist the compression of the nut or bolt head with the resistance to compression being taken through the bridging portion 20. The two annuli in effect work in opposition to one another because, as one considers particularly Fig. 8, as the free end 24 of the outer annulus is urged downwardly, the portion 17 of the inner annulus is urged upwardly and the resistance between the inner and outer annuli to the compressive force occurs through the bridging portion 20. Similarly, as portion 19 of the inner annulus is urged downwardly, the portion 21 of the outer annulus is urged upwardly and the resistance to the flattening of the washer occurs through the bridging portion. At the same time, the helical shape of the outer annulus also resists compression in the manner that the outer annulus in the Figs. 1–4 construction resists compression.

With the construction shown in Figs. 6–8, the entire washer is resistant to compression instead of only either the inner or outer annulus as with the other washer constructions shown. Therefore a greater resistance to compression is developed in the Figs. 6–8 construction than with the other constructions and the locking action of the washer is thereby greater.

What I claim is:

1. A lock washer comprising an outer annulus and an inner annulus, said inner annulus defining a hole having a longitudinal axis, a minor portion of the inner annulus being integral with and substantially coplanar with a portion of the outer annulus to provide a substantially coplanar bridging connection for the annuli, one of the annuli having the form of a closed annulus, the other of the annuli having the form of a substantially helical annulus of substantially 360 degrees emanating from and having a fixed end at a first side of said bridging connection and terminating in a free end adjacent to and spaced axially in one direction from the second side of said bridging connection, the major portion of said closed annulus being substantially coplanar and consisting of a first portion and a second portion, said major portion of said closed annulus being positioned in a plane at a predetermined angle to said bridging connection such that said first portion thereof emanates from said first side of said bridging connection and extends axially outwardly in said one direction from said bridging connection and said second portion thereof emanates from said second side of said bridging connection and extends axially outwardly in the other direction from said bridging connection.

2. A lock washer in accordance with claim 1 wherein said outer annulus is the helical annulus and said inner annulus is the closed annulus.

3. A lock washer in accordance with claim 2 wherein said free end of said helical annulus is bent slightly out of its helical plane toward said bridging connection to minimize entanglement with other washers.

References Cited in the file of this patent

UNITED STATES PATENTS

| | | |
|---|---|---|
| 349,674 | Vaughan | Sept. 21, 1886 |
| 917,776 | Legere | Apr. 13, 1909 |
| 1,010,391 | Lambie et al. | Nov. 28, 1911 |
| 1,146,380 | Woodings | July 13, 1915 |
| 1,520,032 | McCulloch | Dec. 23, 1924 |
| 1,753,313 | Norwood | Apr. 8, 1930 |
| 2,520,459 | Dohm | Aug. 29, 1950 |
| 2,529,343 | Lamb | Nov. 7, 1950 |

FOREIGN PATENTS

| | | |
|---|---|---|
| 258,200 | Italy | Apr. 9, 1938 |